United States Patent [19]

Nozawa

[11] 4,429,536

[45] Feb. 7, 1984

[54] LIQUEFIED NATURAL GAS-REFRIGERANT ELECTRICITY GENERATING SYSTEM

[76] Inventor: Reikichi Nozawa, To-7-204, Tamagawa Jyutaku, Somechi, Chohfu-shi, 182, Japan

[21] Appl. No.: 323,509

[22] Filed: Nov. 23, 1981

Related U.S. Application Data

[63] Continuation-in-part of Ser. No. 973,735, Dec. 28, 1978, Pat. No. 4,330,998.

[30] Foreign Application Priority Data

Dec. 29, 1977 [JP] Japan .................................. 52-159500

[51] Int. Cl.³ ............................................. F01K 23/04
[52] U.S. Cl. ...................................... 60/655; 60/648; 60/651; 62/52

[58] Field of Search ................. 60/648, 651, 655, 671; 62/52 R, 53

[56] References Cited

U.S. PATENT DOCUMENTS

| | | | |
|---|---|---|---|
| 3,992,891 | 11/1976 | Pocrnja | 60/648 X |
| 4,033,135 | 7/1977 | Mandrin | 60/648 |
| 4,036,028 | 7/1977 | Mandrin | 62/52 |

Primary Examiner—Allen M. Ostrager
Assistant Examiner—Stephen F. Husar

[57] ABSTRACT

The present invention relates to a power generation system, using refrigerant as an agent to circulate between a warm heat source and a cold heat sink, thereby producing electric power and alleviating the thermal pollution in the environment, gasifying liquid natural gas, and heating the produced natural gas toward ambient temperature.

17 Claims, 2 Drawing Figures

LIQUEFIED NATURAL GAS-REFRIGERANT ELECTRICITY GENERATING SYSTEM

REFERENCE TO RELATED APPLICATIONS

This application is a Continuation-in-Part application of U.S. Pat. Application No. 973,735 filed Dec. 28, 1978 and entitled "LIQUEFIED NATURAL GAS-FREON ELECTRICITY GENERATION SYSTEM", now U.S. Pat. No. 4,330,998, which is hereby incorporated by reference.

BACKGROUND OF PRIOR ART

The present invention relates to a refrigerant power plant with an LNG heat sink, where LNG means "liquefied natural gas". To be more precise, the present invention concerns a novel power generation system that uses a refrigerant as a working fluid which is subjected to cooling by LNG directly or indirectly, pressurized by compressors, vaporized by heating, and which expands to drive turbines and generates electric power.

Some industrialized countries are poor in domestic energy resources. Japan, for example, imported 16.8 million tons of LNG ($-162°$ C.) and 10 million tons of liquefied petroleum gas ($-42°$ C.) in 1980 and is expected to consume more than 40 million tons of LNG every year in the near future. In such a country, gasification plants for LNG use an LNG-vaporizer of the combustion type where LNG flowing inside stainless steel tubes is vaporized and heated toward ambient temperature in a water bath warmed by the combustion gas from a submerged burner. Unfortunately, the LNG-vaporizer of this type consumes fuel in the amount of 2% of the product natural gas and is used only for on the spot inland service or for adjusting the load quickly to cover a sudden increase in need, i.e. for meeting the peak load.

For the base load, current gasification plants use sea or river water as a heat source to keep their running cost low, but these plants also have some drawbacks. First, they cause significant cooling of the surrounding sea or the river water which impacts the ecology therein. Second, their vaporizer works at high pressures, such as 70 kg/cm2, of LNG and pumping devices for it are difficult to maintain and are quite expensive because they have to work at extremely low temperatures. Last but not the least, a considerable amount of energy must be expended to pump and heat LNG. Preferably, an optimum power should be recovered when gasifying LNG because so much power was expended when the liquid state of natural gas was realized.

The present invention aims at moderating the heat pollution caused by the exhaust heat of a conventional steam power plant and the cold pollution caused by the exhaust cold from a gasification plant of LNG. To make clear the contribution this invention has on the energy problem, particularly the heat pollution problem on rivers and in seas, and to understand the motivation and background of the invention, reference is made to the above-mentioned copending U.S. Pat. Application No. 973,735.

BRIEF SUMMARY OF INVENTION

The main object of the present invention is to use a refrigerant which absorbs heat discharged from a condenser, for example of a steam power plant, to convert a part of the absorbed heat into mechanical power driving turbines to generate electric power, to discharge the other part of the absorbed heat to gasify LNG, and to heat the produced natural gas toward ambient temperature through the condenser of the steam power plant.

In simple language, it is a refrigerant power plant and also an LNG-gasification plant that absorbs heat discharged through a condenser of a steam power plant, converts a part of the working refrigerant's enthalpy to mechanical power, discharges heat to gasify LNG, and is equipped with means for heating the produced natural gas toward ambient temperature.

A most useful example is given by a triplex system for power generation which is an LNG-gasification plant at the same time. "Triplex" means a system consisting of a steam power plant, a Freon refrigerant power plant and a nitrogen power plant, of which the former two are connected by a first heat exchanger and the latter two by a second heat exchanger. The nitrogen transmits heat to LNG for its gasification through a third heat exchanger, the Freon refrigerant transmits heat to both the nitrogen and the produced natural gas through the second heat exchanger, and the steam discharges heat to warm up both the freon and the natural gas, thus LNG and its produced gas act as triple heat sinks.

Other objects and advantages are made apparent in the following detailed description with reference to the above-mentioned copending U.S. Pat. Application No. 973,735 and to the accompanying drawing.

DETAILED DESCRIPTION OF THE INVENTION

Figure 1:
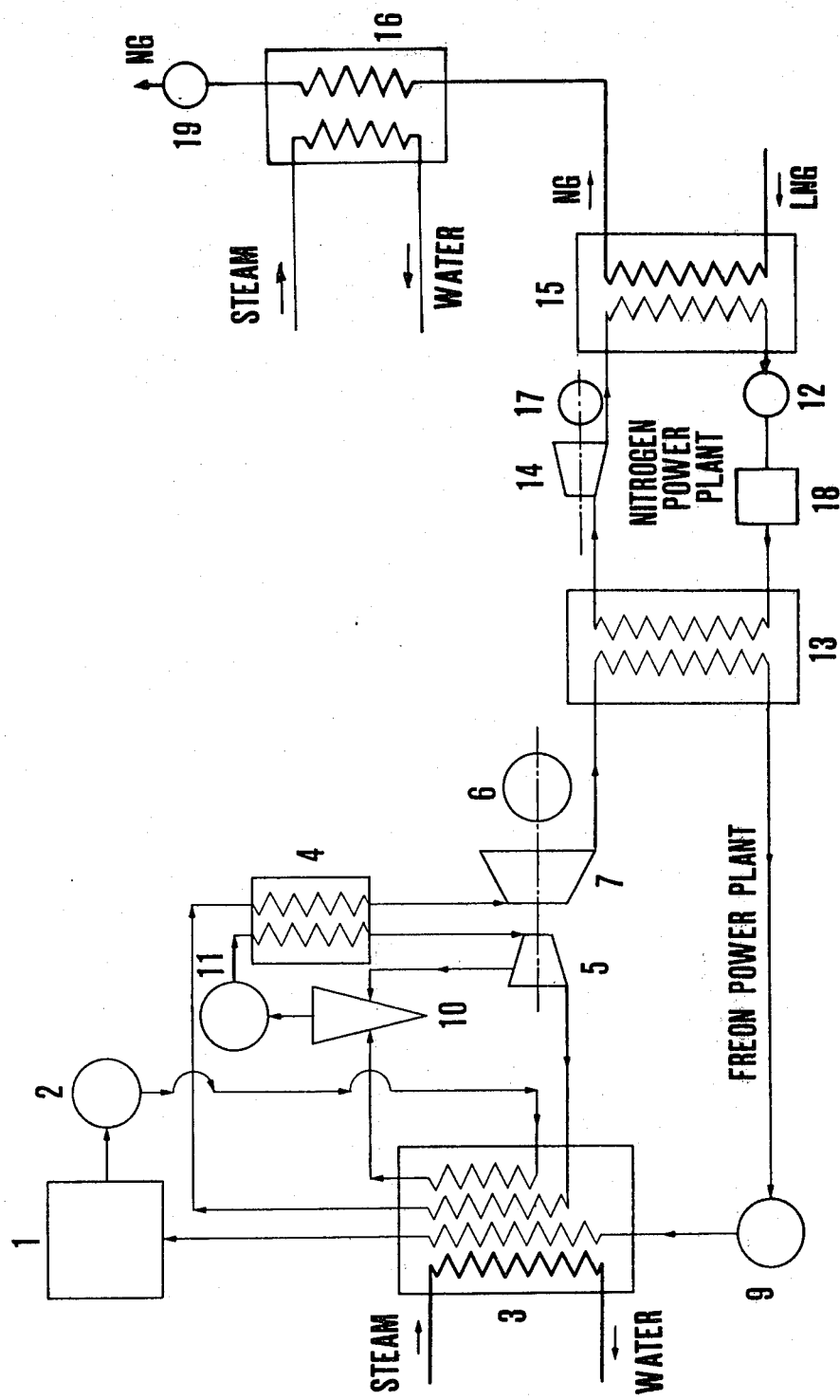
FIG. 1 is a drawing that illustrates the ideas in an embodiment of the present invention, i.e., a freon nitrogen power plant with an LNG-heat sink.

As a refrigerant, a working fluid, or our power plant, we first consider a Freon refrigerant.

Freon is a registered trademark of the Dupont Chemical Company, is mentioned in the present text to mean collectively the halogen substituted hydrocarbon compounds. It serves as a working fluid of a power plant because of the following characteristics:

1. nonflammable and nonexplosive;
2. chemically stable, and noncorrosive on metallic components of the power plant;
3. not very harmful in the case of leakage due to mechanical failure;
4. has quite low vapor pressure at $-162°$ C. (boiling point of LNG).

It is recommended in practice to choose a freon or its mixture which possesses further the following characteristics:

5. inexpensive;
6. has its freezing point below $-162°$ C.;
7. has its critical pressure below 50 atmospheres;
8. has its critical temperature above $15°$ C.

A comment on the above restrictions 6 to 8 is given below: Suppose a Freon refrigerant power plant using LNG at state (1 atm, $-162°$ C.) as a heat sink. Then the Freon refrigerant should not freeze at $-162°$ C., hence the restriction 6. Therefore, one cannot choose, for example, Freon refrigerants R-11, R-12, R-21, R-22, R-112, R-113, R-114, R-115, R-116, R-142, R-500, R-502, R-C318, R-114B2, which are commonly used as refrigerants but which have freezing points above $-162°$ C.

The restriction 6 could be alleviated by adopting in place of −162° C. a saturation temperature above −162° C. and below −82° C., the latter approximating the critical temperature of natural gas corresponding to the critical pressure of 46 atm. However, LNG would become a weaker heat sink on account of the smaller heat of evaporation as the corresponding saturation pressure is raised up toward 46 atm.

Further, the Freon refrigerant should preferably experience a super-critical temperature in the cycle in order to realize a freon power plant with appreciable thermal efficiency. Of course, the higher the critical pressure is, the more mechanical strength needed for the metals forming the high pressure boundaries. This imposes the restriction 7 on the choice of possible freons. The restriction 7 effectively eliminates Freon refrigerants R-21, R-22, R-23 and R-114B2 which have higher critical pressures than 50 atmospheres.

The restriction 8 selects such refrigerants that can be condensed easily under compression, and exludes Freon refrigerant R-14, for example. Thus, the only Freon refrigerant which are usable are R-13 and R-13B1 among the eighteen different varieties of freon which were considered for use as a working refrigerant.

The last two mentioned types of Freon refrigerant are possible working refrigerants in a Freon refrigerant power plant. However, none of these Freon refrigerants would be feasible as a working refrigerant if they attain high temperatures which cause substantial decomposition at some point in the cycle. We are facing the issue that some Freon refrigerants have a tendency to decompose very slowly in the temperature range of 105° C. to 150° C., especially in the presence of oil, water, iron and copper, although they are in general chemically stable compounds. Therefore, for the safe, stable and lasting running of the Freon refrigerant power plant, it is important to employ a heating cycle, such as in the following, to lower the maximum temperature of the working Freon refrigerant.

In the following, Freon refrigerant R13B1 (chemical formula $CF_3Br$) is chosen and is shown to be a feasible working fluid.

According to the illustration of FIG. 1, 1 is a supply tank that contains Freon refrigerant R13B1 at state (1 Bar, −60° C.); the Freon refrigerant taken from the tank 1 is pressurized by a compressor 2 to a state (100 Bar, −35° C.), then input to a heat exchanger 3 such as the condenser of a steam power plant or nuclear power plant; the Freon refrigerant absorbs heat discharged from the condenser of the steam power plant or the nuclear power plant (using a steam turbine to force the steam through the condenser) and is heated to state (100 Bar, 5° C.) before being input to a heater 4. (The optional intermediate stage 10, 11 will be discussed later). The Freon refrigerant is heated by the heater to a state (100 Bar, 148° C.) and led to a high pressure gas turbine 5 which generates electric power by means of a generator 6. After passing through the high pressure turbine, the Freon refrigerant expands to a state (1.4 Bar, −53° C.), then it is led into the heat exchanger 3 and reheated to a state (1.4 Bar, 5° C.). Thereafter, it is heated further by the heater 4 to (1.4 Bar, 20° C.). Flowing out from the heater 4, the Freon refrigerant is led into a low pressure turbine 7 and generates electric power by means of generator 6 operated by turbines 5 and 7 in common. After passing through the low pressure turbine 7, the Freon refrigerant is led into a heat exchanger 13 and condenses to a state (0.013 Bar, −120° C., liquid) by transferring heat either to LNG or to nitrogen circulating through a nitrogen power plant. Subsequently, it is pressurized to a state (1 Bar, −100° C.) by a pump 9. The (1 Bar, −100° C.) freon is led again into the heat exchanger/condenser 3 of the steam power plant and heated to the primary state (1 Bar, −60° C.) and returned to the storage tank 1. Note that the heat exchanger/condenser 13 is connected directly to the exit of the low pressure gas turbine.

A part of the Freon refrigerant may be optionally extracted from a mid-stage of the high pressure gas turbine 5 and mixed in a mixing device 10 with the cold freon taken out from the storage tank (after first passing through heat exchanger 3 to produce a saturated liquid. Such a regeneration process improves the heat efficiency of the process cycle. The cycle is composed of the following process steps:

Freon refrigerant from storage tank 1 is pressurized by the compressor 2, heated through heat exchanger/condenser 3 of a steam power plant, heated by direct mixing, in the mixing device 10, with extracted vapor, pressurized by a compressor 11, heated by the heater 4, expanded in the high pressure gas turbine 5, reheated by heat exchanger/condenser 3 of the steam power plant, reheated by the heater 4, expanded in the low pressure gas turbine 7, liquefied by the heat exchanger 13, pressurized by the pump 9, heated by the heat exchanger/condenser 3 of the steam power plant, and returned to the supply tank 1.

In the cycle just described, the Freon refrigerant entering heat exchanger 13 may be cooled directly by the flow of LNG through heat exchanger 13, or an intermediate nitrogen power plant can be inserted between the LNG source and the Freon refrigerant condenser (heat exchanger 13) to produce additional electric power. Such a system which includes a nitrogen power plant is termed a duplex power plant.

Thus, the paid efficiency of approximately 72% for the cycle of Freon refrigerant R13B1 not incorporating a nitrogen power plant can further be improved to 78% by combining with it a nitrogen power plant with an LNG-heat sink.

In such a duplex power plant, LNG as a cooling agent of the condenser 13 of the freon power plant is replaced by cold nitrogen, and a part of the heat absorbed by the nitrogen is converted into mechanical or electric power by a turbine 14 driving an electrical generator 17.

A thermodynamic cycle of nitrogen used to attain the above purpose is described in the following. The nitrogen gas at the exit of heat exchanger 13 expands in the turbine 14 and begins to liquefy at the entrance of a heat exchanger 15 (a condenser which condenses nitrogen) which is cooled by and evaporates LNG (−162° C.). After passing through the heat exchanger 15, the nitrogen is pressurized by a pump 12, led into a storage means 18, and delivered to the heat exchanger 13 which heats up the nitrogen, thus completing the closed cycle for nitrogen.

The inventor of the present invention has filed a patent application related to a nitrogen power plant on Mar. 30, 1977, and the application was published in the Japanese Official Gazette on Oct. 25, 1978. (Official Gazette - Patent, Office of Patent, Japan, Volume 53 - 122040).

It is to be noted here that a duplex power plant, that is a freon-nitrogen power plant with an LNG-heat sink has merit not only because it improves the thermal efficiency of the corresponding Freon refrigerant power plant, but also because it permits one to choose the working freon from a wider group of Freon refrigerants than in a Freon refrigerant power plant. For example, Freon refrigerants R-12, R-13, R-22, R-23, R-500, R-502, and R-13B1 which do not freeze at the temperature of $-150°C$. and have sufficiently high critical temperatures together with critical pressures lower than 51 atmospheres, may be used in such a duplex power plant. Thus, the duplex power plant with an LNG-heat sink is not a mere minor modification of a Freon refrigerant power plant with an LNG-heat sink, but is a substantial improvement thereover.

FIG. 1 also shows yet a further improvement which increases the overall efficiency of the duplex plant and makes further beneficial use of industrial waste heat. Thus, in a preferred embodiment of the invention, the natural gas evaporated through heat exchanger 15 is conducted further to a heat exchanger 16. The natural gas heated through heat exchanger 16 is led to a pump 19 for transmission.

Also entering the heat exchanger 16 is fluid from a heat source such as exhaust steam from a cooling water system of an industrial plant. The heat exchanger 16 thus both heats the natural gas toward ambient temperature and aids in condensing the exhaust steam from the industrial plant.

Figure 2:
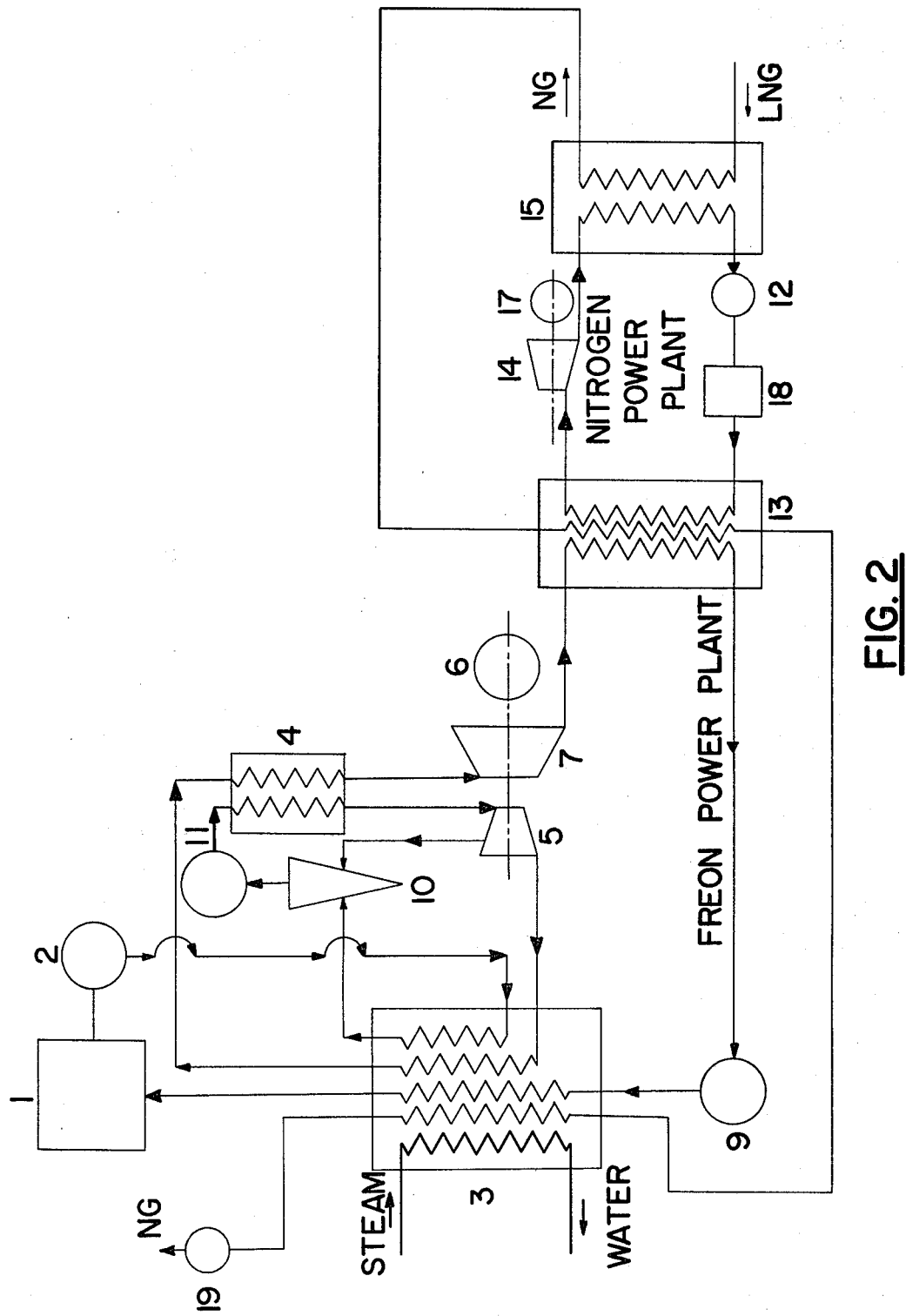

In the foregoing, heat exchanger 3 was described, in example, as a steam condenser of an industrial plant. Any other heat source could be used in heat exchanger 3 such as, for example, the flue exhaust of a blast furnace. Similarly, heat exchanger 16 can be heated by exhaust steam, flue exhaust heat, and the like, and the two heat exchange devices 3 and 16 may utilize the same or different heat sources. Moreover, heat exchanger 3 and heat exchanger 16 preferably comprise component parts of a single heat exchanger as is shown in FIG. 2. Furthermore, as suggested supra, the basic power generating plant will operate with mixing device 10 and compressor 11 bypassed, and without the nitrogen power plant (in which case LNG condenses the Freon refrigerant gas directly in heat exchanger 13). However, the addition of these devices in the system improves the paid efficiency thereof, and thus produces more electric power for the same heat transfer to and from the system than without them.

A most elegant example is an LNG-gasification plant shown in FIG. 2 which comprises heat exchangers 15, 13 and 3, the latter two playing the role of heat exchanger 16 in FIG. 1. It is also a triplex power plant consisting of a steam, a Freon refrigerant, and a nitrogen power plant. Suppose that 1 ton of LNG is gasified every day by heat exchanger 15 and that 1 ton of natural gas is heated every day by heat exchanger 13 from $-160°$ C. to $-124°$ C. and by heat exchanger 3 from $-122°$ C. to $5°$ C. Then the LNG should absorb the evaporation heat of 5.91 kw equivalents through the heat exchanger 15, and the natural gas should absorb the sensitive heat of 0.89 kw equivalents through the heat exchanger 13 and the sensitive heat of 3.14 kw equivalents through the heat exchanger 3.

Assuming for simplicity that the above heat exchangers work with an efficiency of 100%, the energy balance of working fluids in the triplex power plant is estimated, using kw as the units, as follows:

|  | Steam | Freon refrigerant R13B1 | Nitrogen | Triplex |
|---|---|---|---|---|
| Heat input from boiler | 17.0 | 7.6 | — | 24.6 |
| Power input from compressor | 0.2 | 0.8 | 0.6 | 1.6 |
| Heat input from heat exchanger | — | 4.9 | 6.3 | — |
| Heat output from heat exchanger | 8.0 | 7.2 | 5.9 | 9.9 |
| Power generated | 8.1 | 6.1 | 1.0 | 15.2 |

Thus, the present LNG-gasification plant supplies 1 ton of natural gas ($5°$ C., 1 atm) by introducing 1 ton of LNG ($-162°$ C., 1 atm) per day and produces a net power of 13.6 kw as the triplex power plant absorbs heat in the amount of 24.6 kw equivalents from the boilers. It consumes 47.4 kg of natural gas per day as fuel and has a thermal efficiency amounting to 50%, assuming that the boilers work with an efficiency of 90%.

A typical conventional steam power plant uses a boiler absorbing 90.3%, a condenser discharging 46.0%, input power equivalent to 1.2%, of the combustion heat of fuel, and generates power equivalent to 39.8% of the same, where the working steam condenses at the temperature of $30°$ C. Hence it produces a net power of 10.5 kw, if fueled with 47.4 kg of natural gas per day. Thus it is a remarkable feature of the triplex power plant that it produces 30% more power than a conventional steam power plant.

In the above estimate of energy balance for the triplex power plant, we have anticipated an improved steam condenser where steam condenses at the temperature $8°$ C. corresponding to the saturation pressure 0.011 Bar. This condenser discharges 42.5% of the combustion heat of fuel and makes the steam power plant generate power equivalent to 43% of the combustion heat of the fuel.

Although Freon refrigerant R13B1 was used as an example of the higher temperature refrigerant and nitrogen as the lower temperature refrigerant, the higher temperature refrigerant can be another Freon refrigerant or halogenated hydrocarbon having its freezing point below the evaporation temperature of the lower temperature refrigerant in the heat exchanger 13, while the lower temperature refrigerant can be nitrogen, a Freon refrigerant, or a halogenated hydrocarbon having its freezing point below the critical temperature of natural gas ($-82°$ C.).

Described above is a preferred embodiment of the present invention to realize a Freon refrigerant nitrogen power plant with an LNG-heat sink. Of course, other related systems containing a heat source and a heat sink can be developed into many different types of embodiments using the spirit and method of the present invention. This is obvious and apparent. For example, although the above presentation utilizes the discharged heat of a steam power plant, the system is not in any way limited by this embodiment. Other heat sources that possess the same effect, such as the discharged heat from steel mills or other factories, can all be used to replace that of a steam power plant. In like manner, the heat sink is not limited to LNG. Other heat sinks that posses a similar effect, such as liquefied petroleum gas and a liquefied gas having a low critical temperature, can all be used to replace LNG. In summary, the specific characteristics of the above examples, i.e., the use of Freon refrigerant as a working fluid, the utilization of the discharged heat of a steam power plant as a heat source, and the use of LNG as a heat sink are only a preferred embodiment of the present invention.

I claim:

1. A method for generating power and for gasifying a liquefied gas, the method including the steps of
    circulating a refrigerant as a working fluid in a closed circuit through a storage tank, a compressor, heating means including a first heat exchanger, a high pressure gas turbine, reheating means, a low pressure gas turbine, a second heat exchanger, a pump, and a heater, said second heat exchanger condensing the working fluid and gasifying said liquefied gas, said first heat exchanger absorbing exhaust heat from an industrial plant and heating both the working fluid and the gasified product of said liquefied gas, said gas turbines serving to extract mechanical power from the working fluid and being connected with electrical generators to produce electric power,
    the method also including the steps of conducting said liquefied gas and its produced gas in an open circuit through said second heat exchanger, said first heat exchanger and a pump withdrawing the produced gas,
    the method being characterized in that the working fluid has its critical temperature above the temperature of the exhaust gas of said industrial plant and has its freezing point below the entrance temperature of said liquefied gas in said second heat exchanger, and in that the working fluid in the circuit is maintained to experience temperatures well below the temperature of its substantial decomposition even in the presence of oil, water, iron and copper.

2. The method according to claim 1, wherein said means for heating the working fluid comprises said first heat exchanger and said reheating means includes said heater.

3. The method according to claim 1 or 2, wherein a regeneration process is superimposed in such a way that a part of the working fluid is extracted from a midstage of said high pressure gas turbine and is mixed with the working fluid heated by said first heat exchanger to produce a saturated liquid of the working fluid and the mixture is conducted through said heater back to the input of said high pressure gas turbine.

4. The method according to claim 1 or 2, wherein said first heat exchanger is a steam-condenser of a steam power plant, characterized in that the steam in said steam-condenser is condensed at a pressure below the steam pressure in a conventional steam-condenser cooled by ambient water.

5. The method for generating power according to claim 1 or 2, wherein the working fluid is a Freon or a halogenated hydrocarbon.

6. The method for gasifying a liquefied gas according to claim 1 or 2, wherein said liquefied gas is a liquefied natural gas or a liquefied petroleum gas.

7. An apparatus for generating power and for gasifying a liquefied gas, comprising a closed circuit containing a refrigerant as a working fluid and comprising an open circuit containing said liquefied gas and its produced gas,
    which closed circuit includes, in series:
    a storage means for the working fluid;
    a compressor coupled to said storage means for pressurizing the working fluid;
    heating means including a first heat exchanger transferring exhaust heat of an industrial plant to both the working fluid leaving said compressor and the gasified product of said liquefied gas;
    a high pressure gas turbine driven by vaporized working fluid from said heating means and producing mechanical power;
    reheating means for heating the working fluid leaving said high pressure gas turbine;
    a low pressure gas turbine driven by the working fluid from said reheating means and producing mechanical power;
    a second heat exchanger functioning as a condenser for the working fluid leaving said low pressure gas turbine and as an evaporator for said liquefied gas;
    a pump for receiving the condensed working fluid from said second heat exchanger and routing it back to said storage means;
    a heater interposed between said pump and said storage means for heating the working fluid; and
    an electrical generator connected in common to said high and said low pressure gas turbines to produce electric power;
    and which open circuit includes, in series:
    said second heat exchanger for gasifying said liquefied gas;
    said first heat exchanger for heating the gasified product of said liquefied gas; and
    a pump for transmitting said gasified product;
    the apparatus being characterized in that temperatures of the working fluid in the circuit are maintained below the temperature of its substantial decomposition, and in that the working fluid has its critical temperature well below the temperature of exhaust heat of said industrial plant and has its freezing point below the entrance temperature of said liquefied gas in said second heat exchanger.

8. The apparatus as claimed in claim 7, wherein said means for heating the working fluid comprises said first heat exchanger and said reheating means includes said heater.

9. The apparatus as claimed in claim 7 or 8, further comprising a regeneration means including a means for extracting a part of the working fluid from a mid-stage of said high pressure gas turbine, a means for mixing the extracted part with the cold working fluid taken out of said storage means and passed through said first heat exchanger, and a means for routing the mixture through said heater back to the input of said high pressure gas turbine.

10. The apparatus as claimed in claim 7 or 8, wherein said industrial plant is a steam power plant and wherein said first heat exchanger comprises a steam-condenser of said steam power plant, characterized in that the steam in said steam-condenser condenses at a pressure below the steam pressure in a conventional steam condenser cooled by ambient water.

11. The apparatus as claimed in claim 7 or 8, wherein the working fluid is a halogenated hydrocarbon.

12. The apparatus as claimed in claim 7 or 8, wherein said liquefied gas is a liquefied natural gas or a liquefied petroleum gas.

13. The apparatus as claimed in claim 7, wherein said second heat exchanger for condensing the working fluid connects the first-mentioned apparatus with a second apparatus to form a duplex system for power generation, said second apparatus comprising a second closed circuit containing a second working fluid and comprising an open circuit containing the said liquefied gas and its produced gas, which second closed circuit includes, in series:

- said second heat exchanger which evaporates the second working fluid and heats the gasified product of said liquefied gas and which is a means for condensing, in the first apparatus, the working fluid flowing in heat-exchange relationship with the second working fluid and with the gasified product of said liquefied gas;
- a gas turbine driven by the vaporized second working fluid;
- a third heat exchanger which condenses the second working fluid and gasified said liquefied gas;
- a pump for receiving the liquefied second working fluid from said third heat exchanger and routing it back to a storage means for the second working fluid which is conducted to said second second heat exchanger; and
- an electrical generator connected to said gas turbine to produce additional electric power;

and which open circuit includes, in series:

- said third heat exchanger functioning as a condenser for the second working fluid and as an evaporator for said liquefied gas;
- a fourth heat exchanger which heats the gasified product of said liquefied gas flowing in heat-exchange relationship with exhaust heat from a cooling system of a second industrial plant; and
- a pump transmitting the gasified product;

said duplex system being characterized in that the second working fluid has a freezing point below the critical temperature of said liquefied gas and in that the working fluid in the first apparatus has a freezing point below the entrance temperature of the second working fluid in said second heat exchanger.

14. The apparatus as claimed in claim 13, wherein said fourth heat exchanger is formed by said first heat exchanger and said second heat exchanger such that the gasified product of said liquefied gas at the exit of said third heat exchanger is conducted to said second heat exchanger, the there-heated gasified product is conducted further to said first heat exchanger and thereafter to a pump for transmission.

15. The apparatus as claimed in claim 14, wherein said industrial plant is a steam power plant and wherein said first heat exchanger comprises a steam-condenser of said steam power plant, characterized in that the steam in said steam-condenser is condensed at a pressure below the steam pressure in a conventional steam-condenser cooled by ambient water.

16. The apparatus as claimed in any of claims 13 to 15, wherein said liquefied gas is a liquefied natural gas or liquefied petroleum gas.

17. The apparatus as claimed in any of claims 13 to 15, wherein said second working fluid is a halogenated hydrocardon.

* * * * *